United States Patent [19]

Shew

[11] 4,415,253

[45] Nov. 15, 1983

[54] SYSTEM FOR SETTING SHEET-FORM TYPE

[76] Inventor: David S. Shew, 1402 Powell St., San Francisco, Calif. 94133

[21] Appl. No.: 369,349

[22] Filed: Apr. 19, 1982

[51] Int. Cl.³ .............................................. G03B 15/00

[52] U.S. Cl. .................................... 354/292; 493/382; 156/299; 156/562

[58] Field of Search ..................... 354/17, 18, 19, 292; 493/345, 347, 380, 382, 325; 156/297, 299, 562; 276/44, 45

[56] References Cited

U.S. PATENT DOCUMENTS

| | | | |
|---|---|---|---|
| 3,736,855 | 6/1973 | Cuenca | 354/292 |
| 3,824,614 | 7/1974 | Shew | 354/292 |
| 4,108,702 | 8/1978 | Welch et al. | 156/297 |

*Primary Examiner*—Alan Mathews
*Attorney, Agent, or Firm*—Donald N. MacIntosh

[57] ABSTRACT

Individual, relatively small sheets of type elements bearing different characters are disposed in an indexed selector board and are removed from it and placed in a fixture proximate the adhesive surface of a type backing strip. A bridge across a strip guide way prevents the shingle style build-up of the type elements as type is set into a long continuous strip.

2 Claims, 3 Drawing Figures

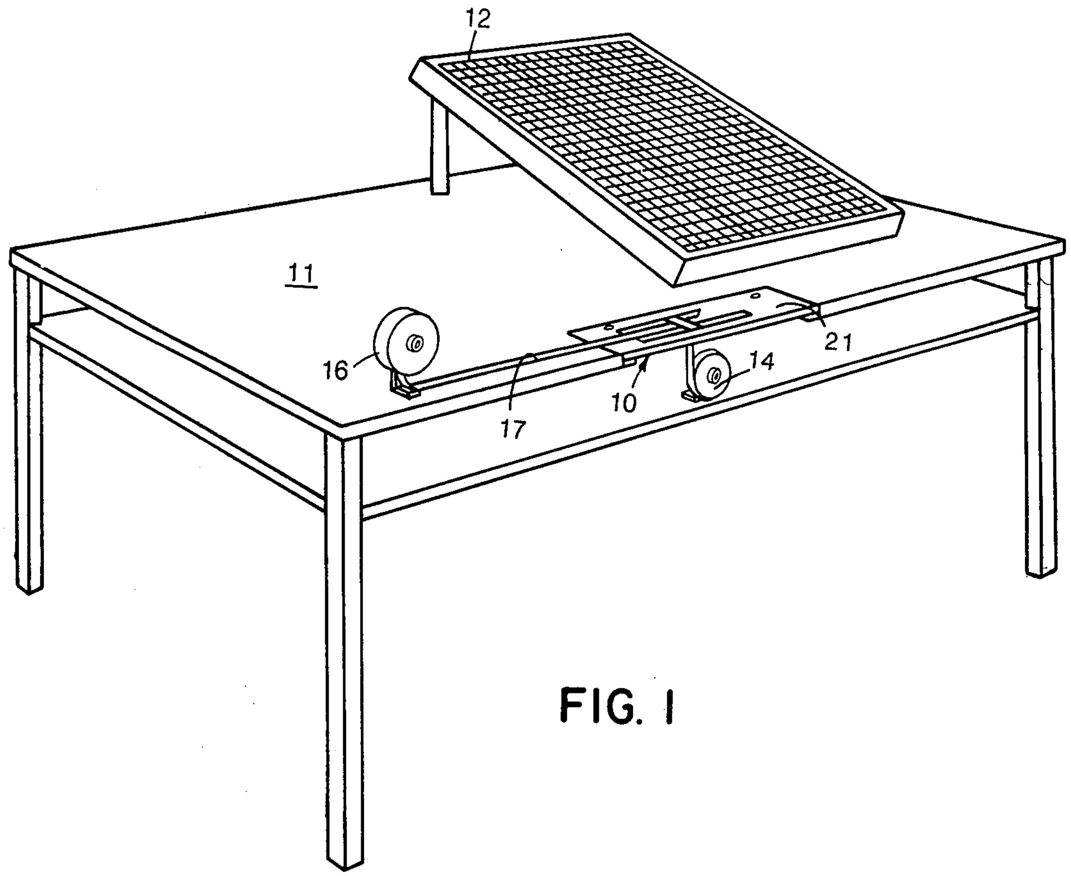
FIG. 1
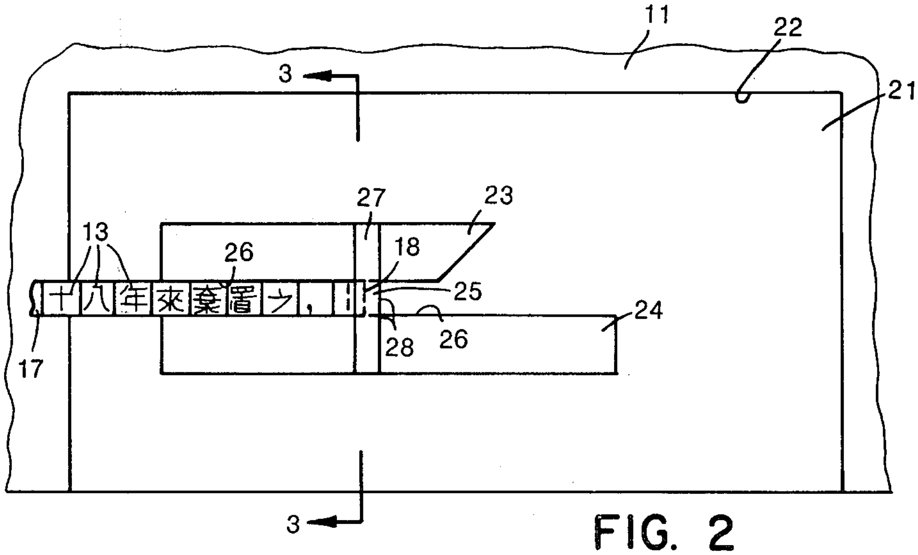
FIG. 2
FIG. 3
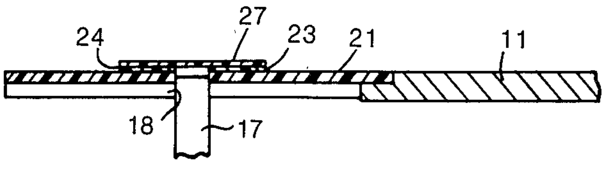

SYSTEM FOR SETTING SHEET-FORM TYPE

This invention relates generally to the printing arts and specifically concerns an intermediate step in the formation of camera-ready copy on an indefinite length strip carrying relatively small elements of sheet-form type. This invention is especially useful in connection with the subject matter disclosed in my issued U.S. Pat. No. 3,824,614 of July 16, 1974 entitled "Equipment for Manufacturing Printed Matter" and in practice of the invention disclosed in my copending application filed Sept. 2, 1980, Ser. No. 183,073, now U.S. Pat. No. 4,343,615, entitled "Process for Forming Printing Characters."

In my earlier patent I disclosed within a system for manufacturing printed matter the concept of placing individual characters on a sheet of paper or the like, of relatively small size, and placing the individual pieces of sheet type into a composition strip to form a line of type. The individual characters were formed on sheets with characters printed on one surface and the sheets were advanced into a machine which separated the characters onto individual squares, each containing a printed character on one surface. Collected together the characters were placed into a container or otherwise stacked and placed into a selector board arranged into a plurality of rows and columns indexed in a logical sequence adapted to the language being printed. This permitted a compositor to go about the task of setting type by lifting the individual squares from the open top containers on the selector board with a hand tool. The type elements were placed into a composition strip to form the line of type. After the necessary lines of type had been arranged in the desired position, the work was photographed by a plate-making camera so as to produce a printing plate.

In the present invention, the placement of type into a composition strip to form a line of type is eliminated because the type is placed directly on an adhesive backing of indefinite length which later may be cut to form the desired line of type in preparing camera-ready copy.

In summary, the invention resides in a system of setting type in a medium suitable for photographing, the type elements being of general rectilinear outline with a common width and having on at least one surface thereof a character visible for photographing, the type elements being formed from sheet material. The apparatus useful in the system comprises means for holding a supply of tape, the tape having on at least one surface thereof a pressure sensitive adhesive for securing type elements to the tape. Take-up means are included for reeving tape having arranged thereon type elements adhesively secured thereto in the selected order for subsequent placement as camera-ready copy. A base is arranged intermediate the tape support and the tape takeup means and serves to support a span of tape for placement of the type elements thereon when the tape extends between the tape supply and takeup means. Parallel guide means are arranged on the base and serve to retain the tape laterally during placement of the tape elements. The base has between said means a tape receiving slot with a width substantially greater than the tape's thickness so as to permit the tape to be shifted longitudinally within the slot for manipulation and placement of the type elements upon the tape. Deflectable bridge means extend laterally of the guide means and are arranged above the slot a distance so that deflection of the bridge means urges the sheet-like elements into adhesive attraction with the tape. The edge of the bridge and the confronting sides of the parallel guide means define a type loading station spaceed from the slot so that a type element may be placed in the loading station and urged beneath the bridge into engagement with the adhesive tape surface for securing the type elements into the tape in a flat, lineal order.

An object of the invention is to provide a system for setting paper or sheet form type which is direct and convenient for rapidly transferring sheet form type from an index board onto a lineal form for subsequent cutting into appropriate lengths as camera ready copy.

Another object of the invention is to provide a system for setting sheet form type in which the individual type elements are fixed directly onto a backing for subsequent use as camera ready copy.

Another object of the invention is to provide a highly simplified fixture permitting sheet form type elements to be accurately positioned upon an adhesive backing so that a long length of type may be prepared and later cut into camera ready line lengths.

Other objects and advantages of the invention will become apparent from the following description taken in connectrion with the accompanying drawing.

FIG. 1 of the drawing is a perspective view of the present invention positioned upon a work table and shown in association with an index board holding a plurality of different type elements.

FIG. 2 is a plan veiw of a type positioning fixture included in the present invention; and FIG. 3 is a sectional view in the direction of arrows 3—3 of FIG. 2.

Apparatus useful in a system for setting type is shown in FIG. 1 of the drawing. The type setting apparatus 10 is shown in FIG. 1 mounted on a work table 11 especially adapted to receive the apparatus 10, there being an index board 12 positioned on the table 11 so that the type setter may view the several type elements contained within the index board 12. The index board 12 may be constructed as disclosed in my issued U.S. Pat. No. 3,824,614 where a plurality of compartments, each opened at the top, are arranged in columns and rows appropriately indexed for the sheet form type elements positioned within the numerous compartments. I contemplate that one compartment contain only a stack or pile of identical characters each on a small sheet. Of course the index furnishes a means for readily locating and removing each small sheet bearing a selected character from a specific pile contained within one of the compartments of the index or selector board 12.

Typical type elements 13 are shown in FIG. 2 and are of generally rectilinear outline, preferably small squares formed from paper, plastic sheet or other desirable sheet materials well known in the field. The type elements may be manufactured in accordance with the disclosure of my co-pending U.S. application Ser. No. 183,073 filed Sept. 2, 1980, now U.S. Pat. No. 4,343,615 or as disclosed in my above-mentioned issued U.S. patent. When aligned as shown in FIG. 2 the type elements 13 may be placed on a suitable base and used directly as camera ready copy as well known in the field.

The type setting apparatus 10 includes means for holding a supply of tape 14 and a takeup reel 16. The holder for the supply of tape 14 may be mounted on the work table 11 beneath the work surface shown in FIG. 1 so that the tape 17 may be reeved upwardly through a slot 18 and then along the top surface of the table to the takeup reel 16. The tape 17 used in the present invention has a pressure sensitive adhesive coating on the surface which is upwardly exposed but may be provided with an adhesive coating on both the top and bottom surfaces, such tape being known in the field as double sided tape. The practice of the present invention is to secure the type elements 13 to the adhesive coating on the tape 17 and then to reeve the length of tape now equipped with type elements 13 onto the reel 16. Later tape is unwound from the reel 16 and placed into the appropriate position on a base (not shown) for use as camera ready copy.

The type setting apparatus 10 includes a plate 21 which contains the slot 18 and is mounted in a recess 22 arranged on the top surface of the work table 11. The top surface of the plate 21 is coplanar with the table surface. A spaced apart pair of guide bars 23, 24 are arranged on the plate 21 to straddle the slot 18 and to define a guideway 26 through which the tape 17 extends. This may be seen from FIG. 3. The guide bars 23 and 24 are just slightly thicker than the tape 17 and with the type elements 13 mounted thereon so that the top surface of the elements 13 are disposed slightly below the top surfaces of the guide bars 23, 24.

A bridge member 27 is fixedly secured across the guide bars 23, 24 and arranged so that the bridge overlies the slot 18 and defines with the adjacent portions of the guide bars a type loading or placement station 25. The edge 28 of the bridge extends to the right of the slot 18. Thus when a length of tape 17 is inserted into the slot 18 and pulled along the guide way 26, type elements 13 may be inserted under the edge 28 of the bridge 27, one at a time, and urged into engagement with the upwardly exposed adhesive surface of the tape to adhere thereto when finger pressure upon the bridge 18 causes it to deflect and push the type elements against the adhesive surface of the tape. It has been found that this procedure gives good adhesion of paper type elements and does not cause the type elements to form into shingle like relationship. A shingle formation of type elements must be avoided in this system where little or no overlap between consecutive type elements is allowed.

When a plurality of type elements like that shown in FIG. 2 are arranged on a length of tape it is unnecessary to cut the tape at the length of each line of copy but the tape may be reeved upon the takeup real 16 until all of the type setting operation for the page or pages is completed. Then the compositor or type setter may cut the tape into the desired length for preparing paste up type for camera ready copy.

This system has been found to be most useful in setting type in the form disclosed in my U.S. Pat. No. 3,824,614 and the present invention is an improvement over my earlier work for the elimination of the previously required channel shaped members for holding the type element during photography. As I explained in my earlier patent, type elements may be moved from the selector board 12 to the tape through use of a probe, either with an adhesive tip or with a suction means coupled to a hollow needle like probe. It will be seen that the width of the slot 18 in the direction of tape movement is substantially greater than the thickness of the tape so that the tape may be urged to the right as viewing FIG. 2 to achieve manipulation between the tape and type elements inserted under the bridge to ensure good adhesion between the type element and tape to prevent the shingle formation type elements from developing.

It will be observed from the above description and the drawings that the features and advantages expressed in the above objects are achieved. While changes and modifications of the above procedure and apparatus will occur to those skilled in this field this invention will be defined by the claims which follow.

What is claimed:

1. In a system of setting type in a medium suitable for photographing, the type elements being of generally rectilinear outline with a common width and having on at least one surface thereof a character visible for photographing, the type elements being formed from sheet material, the apparatus comprising, means for holding a supply of tape having on at least one surface a pressure-sensitive adhesive for securing type elements on the tape, take-up means for receiving tape having mounted thereon type elements adhesively secured thereto in a selected order for subsequent placement as camera ready copy, a base intermediate said tape support and said tape take-up means and serving to support a span of tape for placement of the type elements when the tape extends between said tape supply and take-up means, parallel guide means on said base serving to retain the tape laterally during placement of type elements thereon, said base having intermediate said guide means a tape receiving slot having a length substantially greater than the tape's thickness permitting the tape to be shifted longitudinally within the slot for manipulation and placement of the type element upon said tape, deflectable bridge means extending laterally of said guide means and arranged above said slot a distance so that deflection of said bridge means urges the sheet-like type elements into adhesive attraction with said tape, the edge of said bridge and the confronting sides of said parallel guide means defining a type loading station spaced from said slot so that a type element may be placed in the loading station and urged beneath said bridge into engagement with the adhesive tape surface for securing the type element to the tape in a flat, lineal order.

2. In a system of setting type in a strip of indefinite length for subsequent photographing as paste-up type, the combination comprising, a plurality of separate planar-type elements formed from sheet material loosely disposed in superpose stacked relationship and having on at least one surface thereof a character suitable for photographing, a supply of tape having on at leasat one surface a pressure-sensitive adhesive serving to secure type elements to said tape, means for holding said supply of tape so that a span of tape may be withdrawn from said holding means and presented to the tape elements adhesive side up, take-up means for reeving tape having arranged thereon a series of type elements adhesively secured thereto in an order selected for subsequent placement as camera ready copy, a base intermediate said tape support as said take-up means and serving to support a span of tape for placement of the type elements thereon when the tape extends between the tape supply and take-up means, parallel guide means on said base serving to retain the tape laterally during the placement of said type elements thereon, said base having intermediate said guide means a tape receiving slot with a length substantially greater than the tape's thickness permitting the tape to be shifted longitudinally within said slot for manipulation and placement of the type elements on said tape, deflectable bridge means extending laterally of said guide means and arranged above said slot a distance so that deflection of said bridge means urges the sheet-like element into adhesive attraction with said tape, the edge of said bridge and the confronting sides of said parallel guide means defining a type loading station spaced from said slot so that a type element may be placed in the loading station and urged beneath the said bridge into engagement with the adhesive surface for securing the type elements to the tape in a flat-lineal order.

* * * * *